United States Patent [19]

Lawrence et al.

[11] Patent Number: 4,779,104

[45] Date of Patent: Oct. 18, 1988

[54] PEN PLOTTER PEN TYPE IDENTIFICATION SYSTEM

[75] Inventors: James Lawrence, Irvine; Aftab H. Kapadya, Brea, both of Calif.

[73] Assignee: Sanders Associates, Inc., Nashua, N.H.

[21] Appl. No.: 86,916

[22] Filed: Aug. 19, 1987

[51] Int. Cl.$^4$ .................... G01D 15/16; G01D 9/00; G06K 7/10

[52] U.S. Cl. .................... 346/139 R; 346/29; 346/46; 346/49; 346/141; 235/456; 235/462; 235/470

[58] Field of Search .............. 346/139 R, 29, 46, 49, 346/141, 139 A, 139 B, 139 C, 140 R; 235/456, 462, 470

[56] References Cited

U.S. PATENT DOCUMENTS 4,521,678  6/1985  Winter ..................... 235/462
4,540,993  9/1985  Gunderson ............... 346/139 R

FOREIGN PATENT DOCUMENTS 57-45099  3/1982  Japan .

Primary Examiner—E. A. Goldberg
Assistant Examiner—Mark Reinhart
Attorney, Agent, or Firm—Donald A. Streck; Wm F. Porter, Jr.

[57] ABSTRACT

A pen type sensor for use in a graphics pen plotter wherein plotter pens are moved along a pre-established path between a pen holding area and a plotting area for reading a plurality of vertically oriented reflective indicia positions thereon to create a binary logic output signal representative of the pen type. There is a hollow body member having a pair of angled front surfaces. Light emitting apparatus is associated with one of the pair of angled front surfaces for directing a light beam to simultaneously strike the indicia positions at a point on the path of pen movement. A plurality of light detectors are associated with the other of the pair of angled front surfaces for receiving on respective sensing surfaces thereof the light beam as it is reflected by reflective indicia on a pen at respective ones of the positions and for creating respective bi-stable output signals reflecting the presence and absense of reflected light on the sensing surfaces. Finally, there is apparatus for reading the output signals from the detector means as the binary logic output signal as pens pass the point on the path.

8 Claims, 2 Drawing Sheets

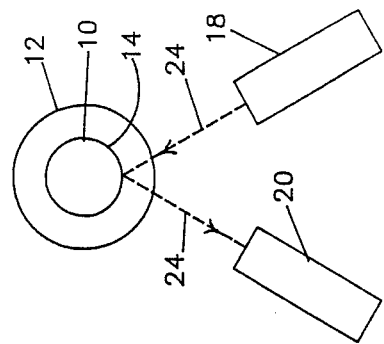
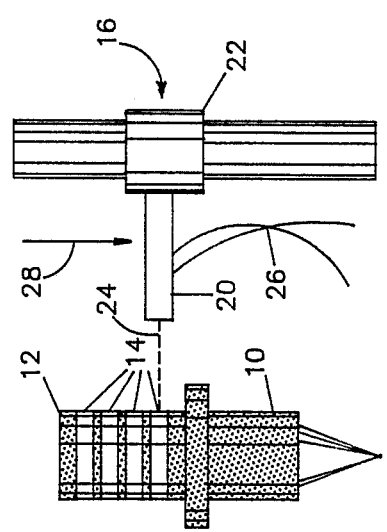
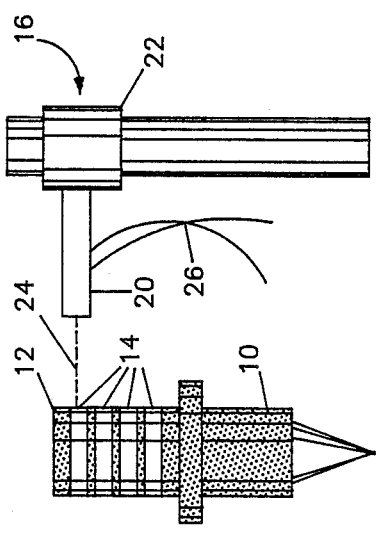
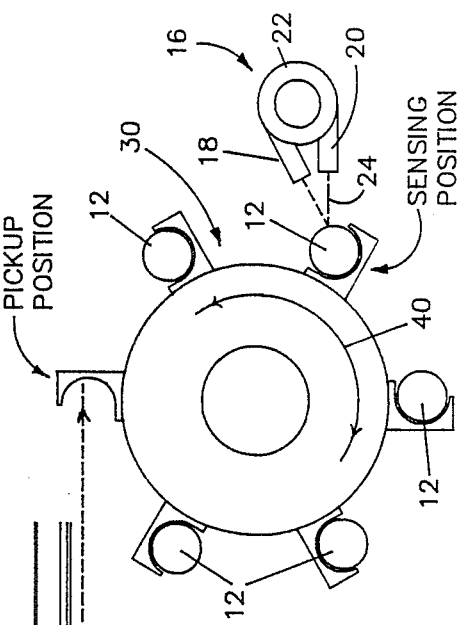
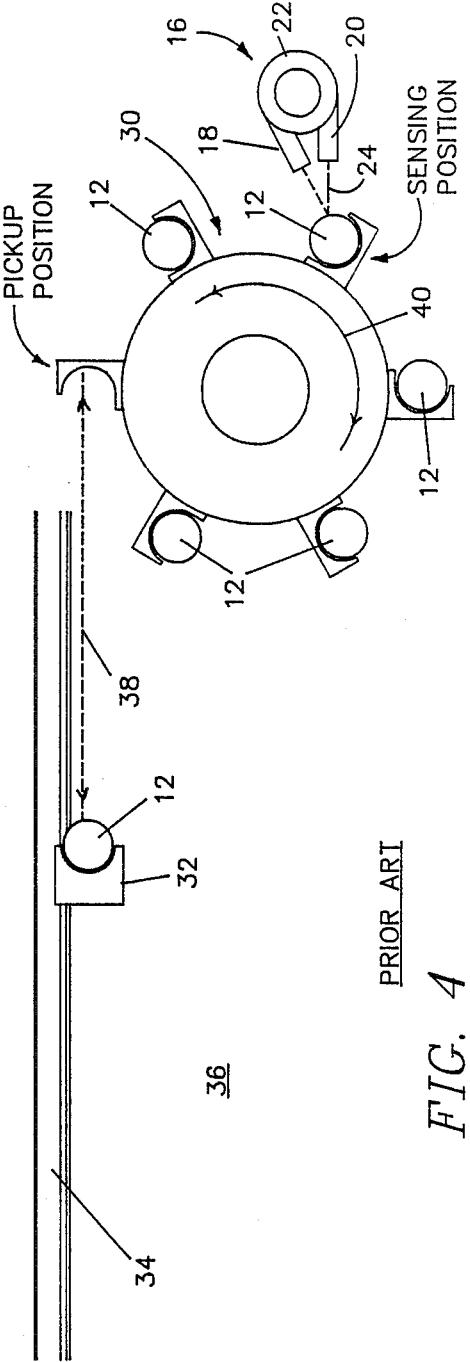

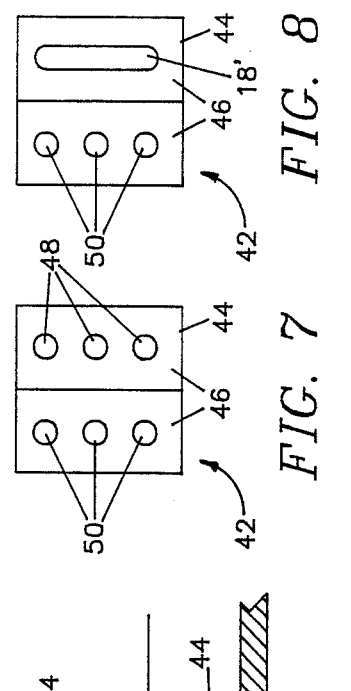
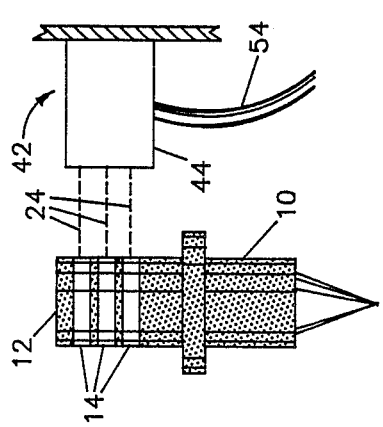
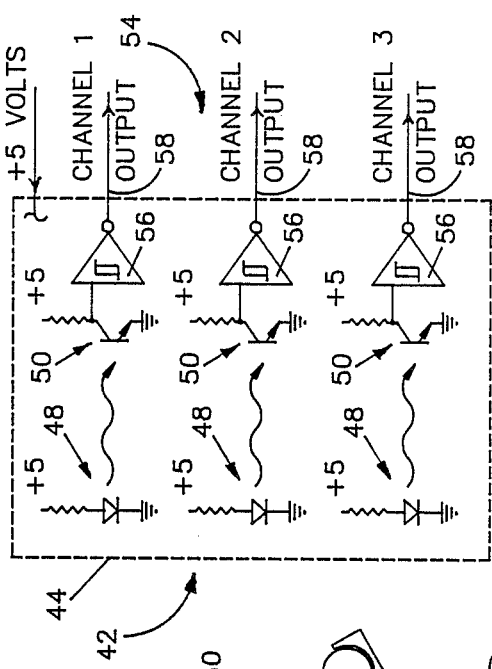
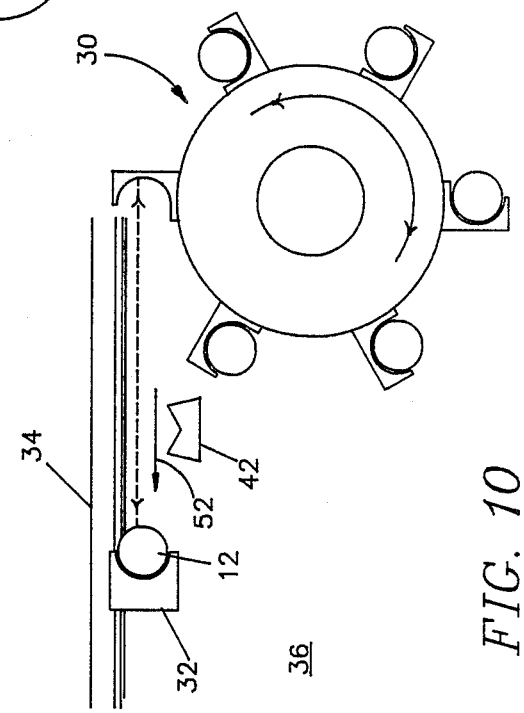

PEN PLOTTER PEN TYPE IDENTIFICATION SYSTEM

BACKGROUND OF THE INVENTION

The present invention relates to pen plotter and pen type indentification systems associated therewith and, more particularly, to a pen type sensor for use in a graphics pen plotter wherein plotter pens are moved along a pre-established path between a pen holding area and a plotting area for reading a plurality of vertically oriented reflective indicia positions thereon to create a logic output signal representative of the pen type comprising, a hollow body member having a pair of angled front surfaces; means associated with one of the pair of angled front surfaces for directing a light beam to simultaneously strike the indicia positions at a point on the path of pen movement; a plurality of detector means associated with the other of the pair of angled front surfaces for receiving on respective sensing surfaces thereof the light beam as it is reflected by reflective indicia on a pen at respective ones of the positions and for creating respective bi-stable output signals reflecting the presence and absense of reflected light on the sensing surfaces; and, means for reading the output signals from the detector means as the logic output signal as pens pass the point on the path.

Modern pen plotters employ a variety of types of pens therein requiring different pen speeds, pen pressures, etc., to create optimum line quality. As a very basic approach, one can provide the plotter with such information prior to the beginning of a plot where a single type of pen is to be employed. Most quality, production grade, commercial plotters, however, employ a multitude of pens even within a single plot for purposes of changing color, line width and the like. Accordingly, it is known in the art to provide each pen with readable indicia so that the pen type can be dynamically determined during the plotting process.

A typical prior art approach to the determination of pen types is shown in FIGS. 1–4. The cylindrical plastic body 10 of each pen 12 is provided with a plurality of strips 14 of reflective tape in a pre-established configuration for each pen type. A sensor system, generally indicated as 16, is used to vertically scan the strips 14 on each pen 12 to determine the pen type. Sensor system 16 comprises a light beam source 18 and a light detector 20 mounted to a moving member 22 so that light 24 striking a strip 14 of reflective tape will be reflected to the light detector 20 to produce a signal on the wires 26. Typically, the source 18 and detector 20 employ modern diode technology; that is, there is a light-emitting diode (LED) within the light beam source 18 and a photo transistor within the light detector 20. The moving member 22 is scanned vertically across the strips 14 as indicated by the arrow 28 by an appropriate mechanism (not shown). Alternatively, of course, the pen 12 could be moved vertically across a stationary sensor to achieve the same results. As those skilled in the art will recognize, if four strips 14 of reflective tape are present at four associated positions on the body 10 of pen 12, the output from the sensor system 16 on wires 26 will be a binary 15, i.e., "1111". By eliminating various ones of the strips 14, the other fifteen possible combinations of four binary bits (i.e., 0000–1110) can be produced. More or less strip positions can, of course, be used as desired for fewer or greater possible numerical designations of type.

The critical portions of interest of a modern pen plotter employing a carousel 30 for holding a plurality of pens is shown in FIG. 4. A pen holder 32 moves back and forth along beam 34 within the plotting area 36 when actively plotting. To pick up or change a pen 12, the pen holder 32 moves from the plotting area 36 off station to the carousel 30 as indicated by the dotted arrow 38. To sense pen type, the carousel 30 must be rotated as indicated by the arrows 40 to first position the desired pen 12 adjacent the sensor system 16 wherein it is vertically scanned by sensor system 16 as described above. The carousel 30 is then rotated to place the pen 12 at the pickup position to be picked up by the pen holder 32. As can be appreciated, this is a two-step operation requiring both time and associated logic within the plotting system to accomplish it. Additionally, the sensor system 16 as described above is relatively complex and parts intensive in order to be able to properly vertically scan the strips 14 in the manner previously described.

Wherefore, it is the object of the present invention to provide a pen plotter pen type identification system which is simple in constructions, does not require a scanning mechanism associated therewith, and which can dynamically scan a pen without the requirement of the pen being moved to a separate sensing location.

It is another object of the present invention to provide a pen plotter pen type identification system which produces output sensing with discrete TTL switching signal levels.

Other objects and benefits of the present invention will become apparent from the description which follows hereinafter taken in conjunction with the drawings which accompany it.

SUMMARY

The foregoing objects have been attained in a graphics pen plotter wherein plotter pens are moved along a pre-established path between a pen holding area and a plotting area by the pen type sensing system of the present invention for reading a plurality of vertically oriented reflective indicia positions thereon to create a binary logic output signal representative of the pen type comprising, means for directing a light beam to simultaneously strike the indicia positions at a point on the path of pen movement; a plurality of detector means for receiving on respective sensing surfaces thereof the light beam as it is reflected by reflective indicia on a pen at respective ones of the positions and for creating respective bi-stable output signals reflecting the presence and absense of reflected light on the sensing surfaces; and, means for reading the output signals from the detector means as the binary output signal as pens pass the point on the path.

In the preferred embodiment, the means for directing a light beam comprises a plurality of light emitting diodes disposed adjacent the path of movement of respective ones of the plurality of vertically oriented reflective indicia positions and the plurality of detector means comprises a plurality of photo transistors disposed adjacent the path of movement of respective ones of the plurality of vertically oriented reflective indicia positions and disposed horizontally adjacent respective ones of the light emitting diodes.

Additionally in the preferred embodiment, the means for reading the output signals from the detector means comprises a plurality of bi-stable devices; means connecting the light sensing detectors to trigger respective ones of the plurality of bi-stable devices; and, means for employing outputs of the bi-stable devices as the binary logic output signals.

DESCRIPTION OF THE DRAWINGS

FIG. 1 is a simplified side view of a prior art pen plotter pen type identification system.

FIG. 2 shows the apparatus of FIG. 1 in the process of being vertically scanned.

FIG. 3 is a top view showing the way in which the sensor system employed in FIGS. 1 and 2 reflects a light beam from reflective tape on the body of a pen.

FIG. 4 is a simplified plan view of the critical portions of a carousel-type pen plotter showing the prior art approach for employing the apparatus of FIGS. 1-3 to sense pen type.

FIG. 5 is a simplified side view of a pen type identification system according to the present invention.

FIG. 6 is a top view of the apparatus of FIG. 5.

FIG. 7 is a front view of the sensor of the present invention in its preferred embodiment.

FIG. 8 is a front view of the sensor of the present invention in an alternate embodiment.

FIG. 10 is a plan view in the manner of FIG. 4 showing the pen type identification system of the present invention and its manner of dynamically sensing pen type during the pen pickup procedure.

FIG. 9 is a circuit diagram of the sensor of the present invention in a three-channel embodiment thereof.

DESCRIPTION OF THE PREFERRED EMBODIMENT

The heart of the pen type identification system of the present invention is the multi-channel sensor 42 shown in FIGS. 5-9. Sensor 42 is of unitary construction. There is a body 44 having a pair of angled front bases 46. The body 44 is adapted to be permanently attached to a mounting bracket, case portion, or the like, by any of numerous means well known to those skilled in the art such as adhesive tape, etc., which form no part of the present invention and are, therefore, not shown in the interest of simplicity and avoidance of redundancy. One face 46 is provided with a plurality of vertically disposed light emitting diodes 48 while the other is provided with a plurality of opposed photo transistors 50. In an alternate embodiment as shown in FIG. 8, a single light source 18' can be employed on one face 46, if desired.

As can best be seen from FIG. 5, the multi-channel sensor 42 creates a plurality of light beams 24 directed at the positions of the strips 14 of reflector tape. Thus, the sensor 42 can be permanently affixed adjacent the path of the pens 12 as shown in FIG. 10. As thus mounted, as a pen 12 is moved past the sensor 42 following pickup from the carousel 30, as indicated by the arrow 52, it is moved past the sensor 42 causing the associated binary configuration of the strips 14 as sensed by the photo transistors 50 to be output on output line 54 dynamically as the pen 12 moves past the sensor 42. It should be well noted that employing the sensor 42 of the present invention, the pen 12 does not have to be moved to any special point for sensing. Sensing can take place anywhere the pen 12 moves past in its normal travel. This, of course, would include positions along the path of rotation of the carousel 30 where the pen type at each position could be determined as the pens were rotated past the point on the carousel 30.

The preferred circuitry for the sensor 42 to achieve the stated objectives is shown in FIG. 9. In the preferred embodiment, the components are all included within the body 44. Each channel comprises an infra red light emitting diode (LED) 48 and an associated photo transistor 50. The output from the photo transistor 50, in each case, is connected as an input to a Schmitt trigger 56, the output 58 of which is the output of the channel. The manner of operaton of such devices are well known in the art and, therefore, in the interests of simplicity and to avoid redundancy, no further detail will be provided. In the preferred embodiment, the output from the Schmitt trigger 56 (i.e., the output from each channel) is greater than or equal to 2.4 volts in the presence of a reflective surface such as a strip 14 directing light 24 from the LED 48 onto the photo transistor 20 and less than or equal to 0.5 volts for dark bands (i.e., no tape strip 14 on the body 10 at the associated position) or when no pen is present. Further in the preferred embodiment, the rise time for each channel output is to be no more than 25 microseconds, where the rise time of a channel is defined as the time it takes for any channel output voltage to go from 10% to 90% of the final voltage level. Propagation delay for each channel output in the preferred embodiment is to be no more than 200 microseconds, where propagation delay is defined as the time it takes any channel to change its output state after the sensing of bands or a reflective surface.

Thus, it can be seen that the pen plotter pen type identification system of the present invention as hereinbefore described has successfully achieved its stated objectives. Dynamic pen type sensing can be accomplished with a simple, non-moving sensor positioned anywhere along the normal path of movement of the pen between the carousel and the plotting area.

Wherefore, having thus described our invention, we claim:

1. A sensor for use in a graphics pen plotter or the like wherein articles are moved along a pre-established path for reading a plurality of vertically oriented reflective indicia positions on the articles to create a binary logic output signal comprising:
   (a) a hollow body member having a pair of front surfaces facing one another in angled relationship;
   (b) means contained within said hollow body member and associated with one of said pair of front surfaces for directing light beams to simultaneously strike the vertically oriented indicia positions at a point on the path of article movement; and,
   (c) a plurality of detector means contained within said hollow body member and associated with the other of said pair of front surfaces for receiving on respective sensing surfaces thereof said light beams as they are reflected by the reflective indicia on an article at respective ones of the positions and for creating bi-stable output signals at respective outputs thereof indicating the presence and absence of reflected light on said sensing surfaces
   whereby said output signals from said detector means in combination are the binary logic output signal.

2. The sensor of claim 1 wherein:
   said means for directing light beams comprises a plurality of light emitting diodes disposed vertically in said one of said pair of front surfaces to be positioned horizontally adjacent the path of movement of respective ones of the plurality of vertically oriented reflective indicia positions.

3. The sensor of claim 2 wherein:
said plurality of detector means comprises a plurality of photo transistors disposed vertically in said other of said pair of front surfaces horizontally adjacent respective ones of said light emitting diodes.

4. The sensor of claim 1 wherein each of said plurality of detector means includes:
   (a) a bi-stable device;
   (b) means connecting said sensing surface thereof to trigger said bi-stable device; and,
   (c) an output of said bistable device being said output signal from said detector means.

5. The sensor of claim 4 wherein:
said bi-stable devices are disposed within said body.

6. The sensor of claim 4 wherein: said bi-stable devices are Schmitt trigger devices.

7. A multi-channel sensor for use in a graphics pen plotter for reading a plurality of vertically oriented reflective strips disposed on pens thereof to create a binary logic output signal comprising:
   (a) a hollow body member having a pair of front surfaces facing one another in angled relationship;
   (b) a plurality of light emitting diodes contained within said hollow body member and disposed vertically in said one of said pair of front surfaces to be positioned horizontally adjacent a path of movement of the pens for directing a plurality of light beams to simultaneously strike the vertically oriented strips at a point on said path of pen movement;
   (c) a plurality of photo transistors contained within said hollow body member and disposed vertically in said other of said pair of front surfaces horizontally adjacent respective ones of said light emitting diodes for receiving on respective sensing surfaces thereof said light beams as they are reflected by respective ones of the strips and for creating bi-stable output signals at respective outputs thereof indicating the presence and absence of reflected light from said strips;
   (d) a plurality of bi-stable devices contained within said hollow body member;
   (e) means contained within said hollow body member connecting said outputs of said photo transistors to trigger respective ones of said plurality of bi-stable devices; and,
   (f) means contained within said hollow body member for employing outputs of said bi-stable devices as said binary logic output signal whereby said output signals from said bi-stable devices in combination are the binary logic output signal.

8. The sensor of claim 7 wherein:
said bi-stable devices are Schmitt trigger devices.

* * * * *